United States Patent
Kotze

(10) Patent No.: US 10,710,911 B2
(45) Date of Patent: *Jul. 14, 2020

(54) EFFLUENT TREATMENT PROCESS—PH REFINEMENT FOR SULPHATE REMOVAL

(71) Applicant: MINTEK, Randburg (ZA)

(72) Inventor: Martha Hendriette Kotze, Randburg (ZA)

(73) Assignee: MINTEK, Randburg (ZA)

( * ) Notice: Subject to any disclaimer, the term of this patent is extended or adjusted under 35 U.S.C. 154(b) by 221 days.

This patent is subject to a terminal disclaimer.

(21) Appl. No.: 15/746,563

(22) PCT Filed: Jul. 22, 2016

(86) PCT No.: PCT/ZA2016/050026
§ 371 (c)(1),
(2) Date: Jan. 22, 2018

(87) PCT Pub. No.: WO2017/015679
PCT Pub. Date: Jan. 26, 2017

(65) Prior Publication Data
US 2019/0002311 A1    Jan. 3, 2019

(30) Foreign Application Priority Data
Jul. 22, 2015 (ZA) .................. 2015/05276

(51) Int. Cl.
*C02F 1/66* (2006.01)
*C02F 101/10* (2006.01)
*C02F 101/20* (2006.01)
*C02F 1/52* (2006.01)
*C02F 103/10* (2006.01)

(52) U.S. Cl.
CPC .............. *C02F 1/5245* (2013.01); *C02F 1/66* (2013.01); *C02F 2001/5218* (2013.01); *C02F 2101/101* (2013.01); *C02F 2101/20* (2013.01); *C02F 2103/10* (2013.01); *C02F 2209/06* (2013.01); *C02F 2303/18* (2013.01)

(58) Field of Classification Search
None
See application file for complete search history.

(56) References Cited

U.S. PATENT DOCUMENTS

| | | |
|---|---|---|
| 2003/0160003 A1 | 8/2003 | Maree |
| 2012/0160770 A1 | 6/2012 | Banerjee et al. |
| 2014/0144843 A1 | 5/2014 | Banerjee et al. |
| 2017/0036936 A1 * | 2/2017 | Paxton ..................... C02F 9/00 |

FOREIGN PATENT DOCUMENTS

| | | |
|---|---|---|
| EP | 0 986 518 | 3/2000 |
| WO | WO 2014/033361 | 3/2014 |
| WO | WO-2015162540 A1 * | 10/2015 |

OTHER PUBLICATIONS

International Search Report; PCT/ZA2016/050026, dated May 12, 2017.
Written Opinion dated May 12, 2017, Application No. PCT/ZA2016/050026.

* cited by examiner

*Primary Examiner* — Bradley R Spies
(74) *Attorney, Agent, or Firm* — Young & Thompson

(57) ABSTRACT

Disclosed is a method of decomposing ettringite, to form amorphous aluminium trihydroxide, which includes the step of lowering a pH of a slurry containing ettringite to a value between 8 and 8.5.

4 Claims, 4 Drawing Sheets (FIRST STAGE)

(SECOND STAGE)

(THIRD STAGE)

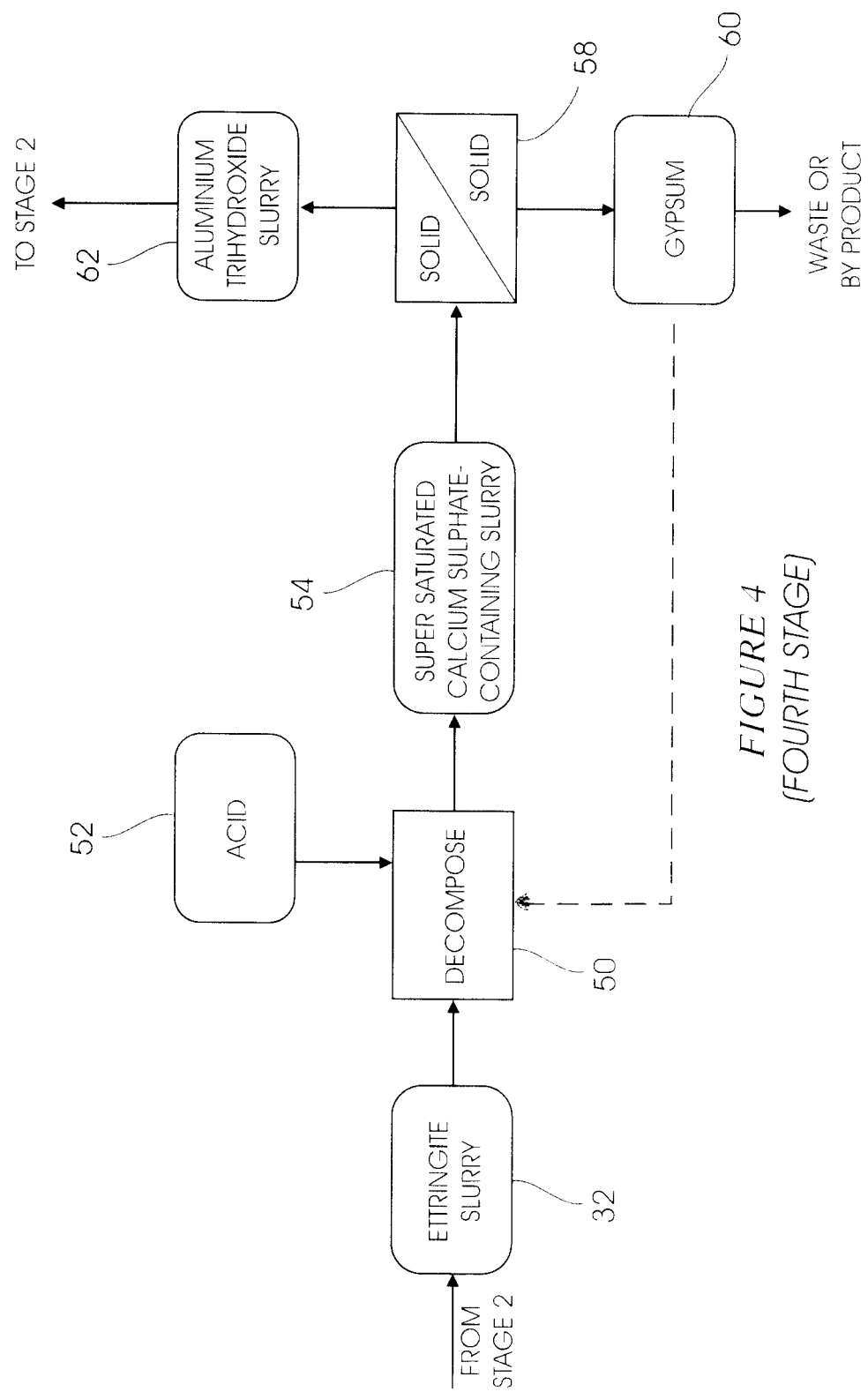
*FIGURE 4 (FOURTH STAGE)*

US 10,710,911 B2

EFFLUENT TREATMENT PROCESS—PH REFINEMENT FOR SULPHATE REMOVAL

BACKGROUND OF THE INVENTION

This invention relates to a process for the removal of heavy metals, calcium and sulphate from contaminated water, typically mine waters.

Effluent streams, and in particular acid mine drainage water, are generally acidic with pH values as low as 1.5. Another characteristic is the high levels of heavy metals, calcium and sulphate associated with the water. Prior to discharge into the environment these waste streams are normally neutralised with lime, a process which leaves large quantities of calcium sulphate in solution. The release of such waters into the environment poses a significant environmental challenge.

International patent application number PCT/GB98/01610 describes a process, generally referred to as "the SAVMIN process", which was developed particularly for the treatment of sulphate-containing mine waters as well as sulphate-containing waste/effluent waters. This process allows for the effective removal of sulphate and calcium from effluent water with the use of amorphous aluminium trihydroxide followed by a subsequent recovery of the latter reagent by decomposing a waste product.

The SAVMIN process is fully described in the specification of the aforementioned patent application and the content of that specification is hereby incorporated fully into this specification.

In one stage of the SAVMIN process, a saturated calcium sulphate water stream (produced by preliminary steps) is combined with amorphous aluminium trihydroxide and a neutralising agent, for example hydrated lime, for the removal of sulphate and calcium from solution, to promote the precipitation of ettringite which is removed from the water stream, e.g. by settling, to produce a slurry.

This is followed by the recovery of amorphous aluminium trihydroxide by decomposing the ettringite slurry at a pH ranging from 4 to 8.5. The pH is lowered by adding sulphuric acid ($H_2SO_4$), resulting in the formation of a supersaturated calcium sulphate solution.

The solids resulting from the decomposition step are gypsum and amorphous aluminium trihydroxide. These solids are separated from one another by means of a suitable solid-solid separation unit, for example, but not limited to hydro-cyclone(s).

The recovered amorphous aluminium trihydroxide is recycled to treat a water stream containing sulphate and calcium. This recovery step ensures that the SAVMIN process is highly cost effective when compared to alternative processes such as ion exchange and membrane separation techniques.

An object of the present invention is to provide a mode of implementing the SAVMIN process in order to optimise the regeneration of amorphous aluminium trihydroxide and simultaneously to minimise the co-precipitation of basic aluminium sulphate. The latter aspect is important for it prevents a reintroduction of sulphate into the ettringite precipitation step during recycling of the precipitate amorphous aluminium trihydroxide.

SUMMARY OF THE INVENTION

FIG. 2 in the SAVMIN patent specification PCT/GB98/01610 illustrates the recovery of amorphous aluminium trihydroxide from ettringite wherein an ettringite slurry is decomposed by lowering its pH to a value of between 4 and 8.5 by the addition of an acid such as sulphuric acid. A second supersaturated solution of calcium sulphate is formed with amorphous aluminium trihydroxide in suspension. The amorphous aluminium trihydroxide is then separated from the second supersaturated solution in a liquid-solid separator 18.

The current invention is based on the surprising discovery that if the ettringite is decomposed at a pH of between 8 and 8.5, the regeneration of aluminium hydroxide is enhanced and the formation of basic aluminium sulphate is reduced when compared to decomposing the ettringite at a pH of between 4 and 8.5.

BRIEF DESCRIPTION OF THE DRAWINGS

The invention is further described by way of example with reference to the accompanying drawings which, in combination, constitute a flow sheet for the SAVMIN process which incorporates modifications according to the present invention, and wherein, specifically:

FIG. 4 shows a fourth stage which embodies an ettringite decomposition stage.

DESCRIPTION OF PREFERRED EMBODIMENT

FIGS. 1 to 4 illustrate aspects of four stages of an effluent treatment process based on the SAVMIN process which is modified in accordance with the teachings of the present invention. These stages involve the removal of metals and sulphate at ambient conditions from contaminated mine waters.

Figure 1:
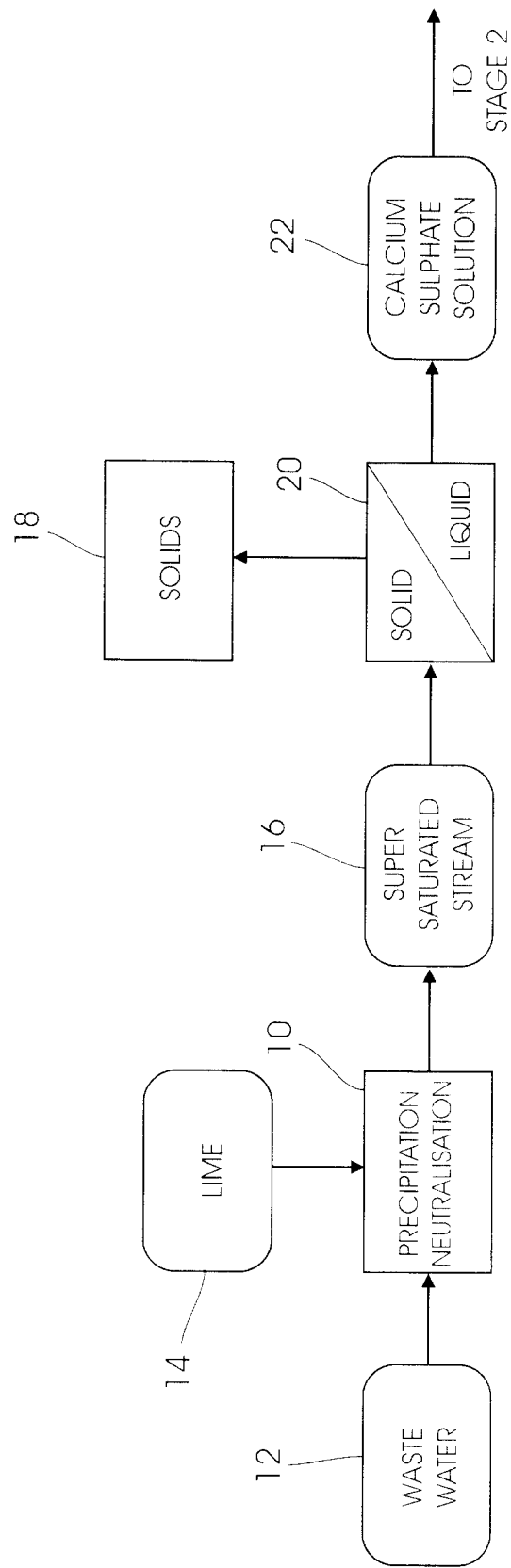
FIG. 1 shows a first stage which embodies a heavy metal and gypsum precipitation stage.

FIG. 1 illustrates a modified first stage of the SAVMIN process. In a step 10 waste water 12, typically acidic mine water, is contacted with an alkali 14 such as hydrated lime ($Ca(OH)_2$) to form a first supersaturated calcium sulphate-containing stream 16 at a pH between 10.0 and 12.0. The supersaturated calcium sulphate-containing stream 16 contains solids 18 in the form of crystallised gypsum and precipitated impurities such as heavy metal hydroxides. The solids 18 are removed from the stream 16 in a liquid-solid separation step 20 to form a first saturated calcium sulphate solution 22.

In the SAVMIN process the precipitated impurities and the gypsum are removed in separate liquid-solid separation steps (see FIG. 1—blocks 1 and 2 of the SAVMIN patent specification).

Figure 2:
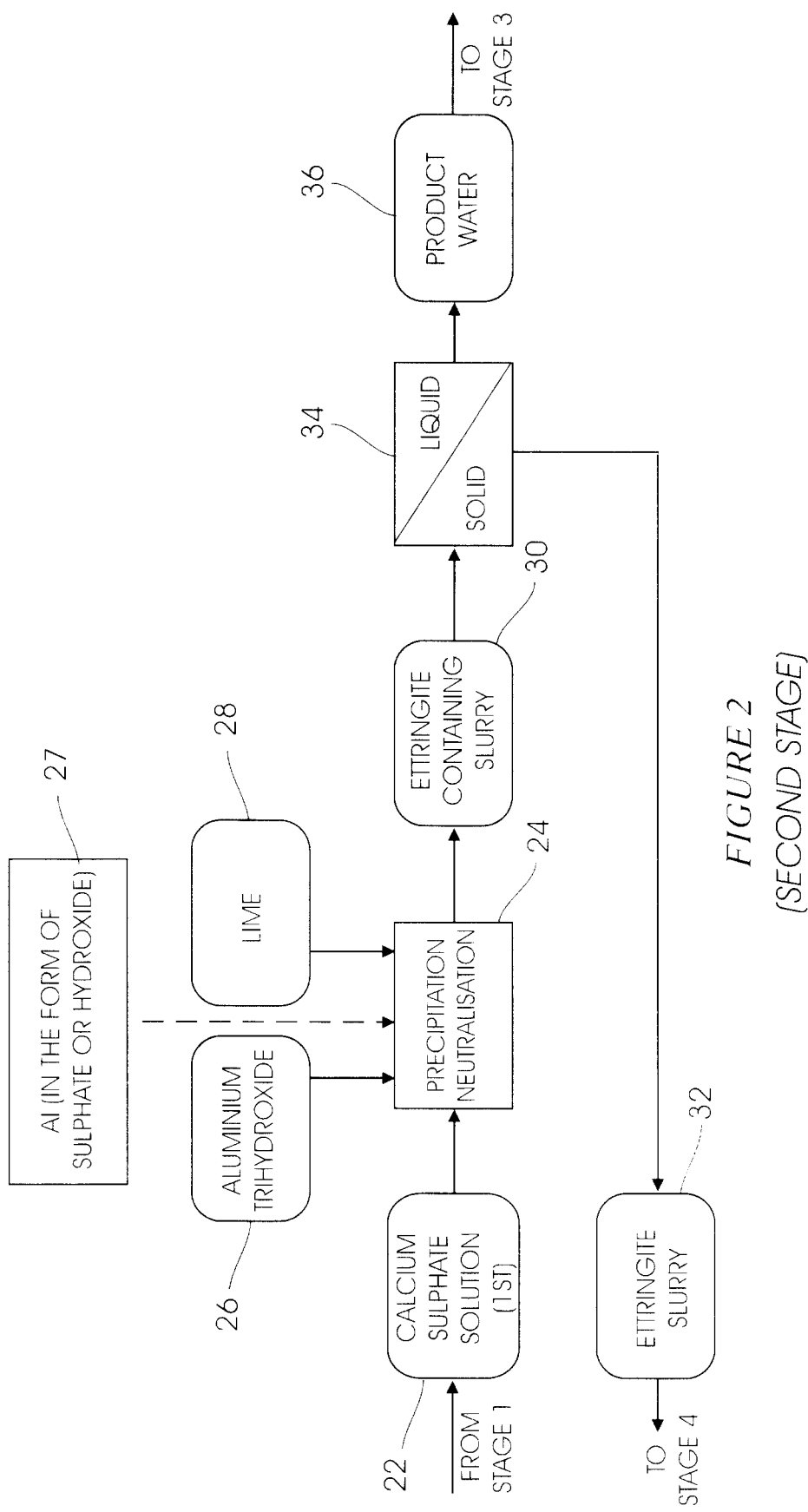
FIG. 2 shows a second stage which embodies an ettringite precipitation stage.
Figure 3:
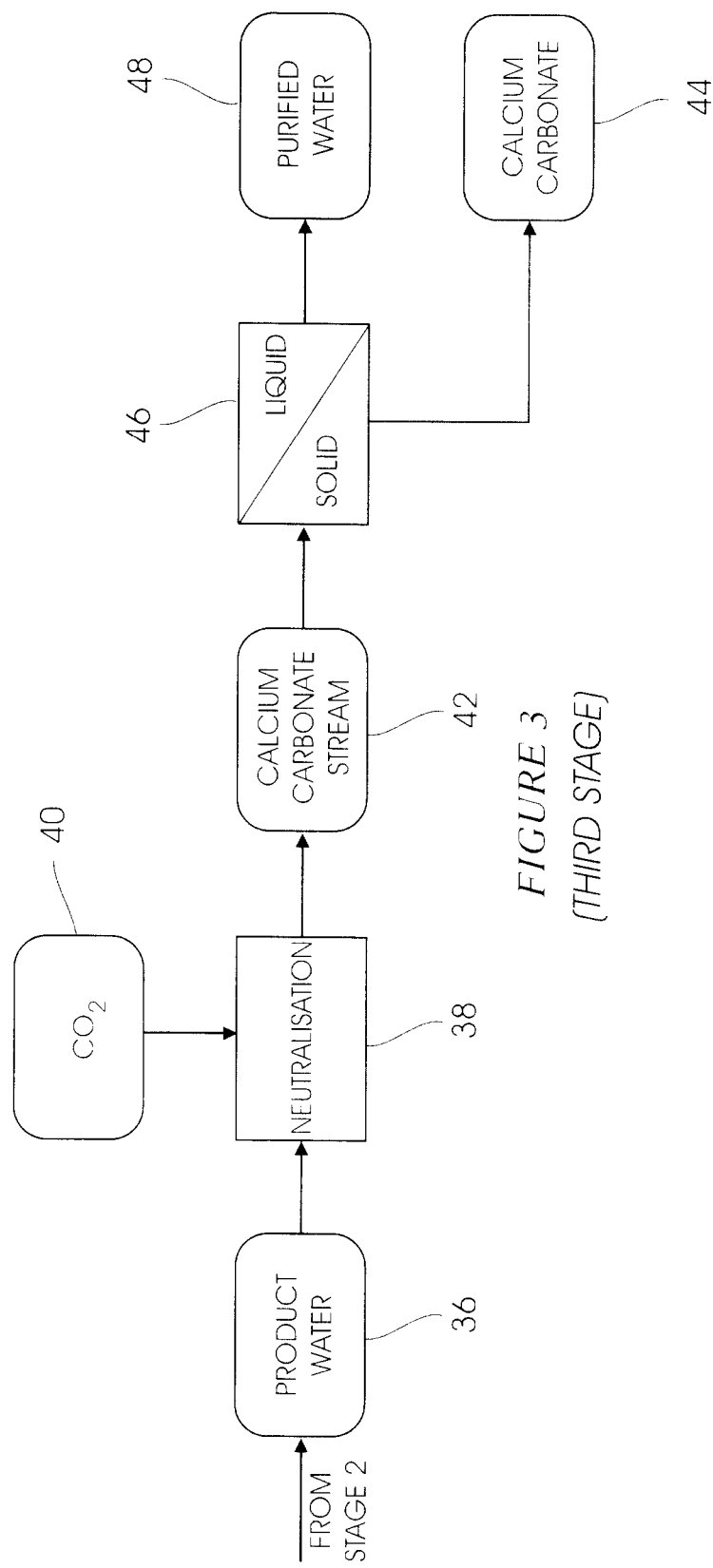
FIG. 3 shows a third stage which embodies a carbonation stage.

In a step 24 in a second stage of the present invention, shown in FIG. 2, amorphous aluminium trihydroxide 26, hydrated lime 28 and a "top-up" aluminium-containing stream 27 (in the form of aluminium trihydroxide or aluminium sulphate) are added to the saturated calcium sulphate solution 22 to form an ettringite-containing slurry 30.

Ettringite 32, in the form of a slurry, is removed from the ettringite-containing slurry 30 in a liquid-solid separation step 34, thereby forming a high pH product water 36 containing low amounts of sulphate.

In a step 38 of a third stage (FIG. 3) gaseous carbon dioxide 40 is used to neutralise the product water 36 and so form a calcium carbonate-containing stream 42. Calcium carbonate 44 is removed from the stream 42 in a liquid-solid separation step 46 to form a purified product water 48.

In a step 50 of a fourth stage (FIG. 4) acid 52, such as, but not limited to, sulphuric acid or hydrochloric acid, is added to the ettringite 32, causing it to decompose and form a second supersaturated calcium sulphate-containing slurry 54 (i.e. containing crystalized gypsum) in which amorphous aluminium trihydroxide is suspended.

The ettringite 32 is decomposed in the step 50 at a pH of between 4 and 8.5. For optimum results, however, the pH of the decomposition stage 50 should be between 8 and. 8.5.

Gypsum and aluminium trihydroxide are separated from one another in a solid-solid separation step 58 to form a gypsum-containing slurry 60 and an aluminium trihydroxide slurry 62. The slurries 60 and 62 each contain a portion of the supersaturated sulphate-containing slurry 54. The solid-solid separation step 58 is mainly achieved by means of size exclusion.

Successful separation of the amorphous aluminium trihydroxide slurry from the gypsum-containing slurry is possible due to the difference in particle size of the gypsum and the amorphous aluminium trihydroxide. The separation is enhanced by increasing the difference between the particle size of the gypsum and the amorphous aluminium trihydroxide. This is achieved by growing of the gypsum particles/crystals by means of seed recycling to form larger particles/crystals. Amorphous aluminium trihydroxide does not readily crystallise or grow in particle size.

A portion of the gypsum slurry 60 is sent to the ettringite decomposition step 50 for seeding. The remaining portion of the gypsum slurry 60 is removed from the system as by-product or waste.

The aluminium trihydroxide slurry 62 is recycled to stage 2 for use in the step 24.

By working in the aforementioned pH range of 8 to 8.5 (as is described hereinafter in the examples), a 99.5% recovery of amorphous aluminium trihydroxide precipitate 62 is achieved. This is to be contrasted with the recovery rate of "greater than 95%" of amorphous aluminium trihydroxide described in the SAVMIN specification. Additionally, the co-precipitation of basic aluminium sulphate, in the ettringite decomposition step, is minimised. This is important because it prevents the reintroduction of sulphate in the ettringite precipitation step when recycling the amorphous aluminium trihydroxide that is also precipitated. The introduction of additional sulphate, in the form of basic aluminium sulphate, increases the lime and amorphous aluminium trihydroxide requirements in the ettringite precipitation step. Ultimately this would lead to an increase in the acid requirement in the ettringite decomposition step.

Aspects of the invention are further described in the following examples:

Example 1

This example illustrates the effect of pH on the formation of aluminium precipitates.

The precipitation of various aluminium phases, namely aluminium trihydroxide ($Al(OH)_3$), from sulphate media at pH values of 6.5, 7.0, 7.5, 8.0 and 8.5 was investigated. The effect of variations in pH on the types of solid phases formed was examined. The sulphate medium used consisted of aluminium sulphate solutions ($Al_2(SO_4)_3$) prepared at 10 g/L. The pH of the medium was controlled with the addition of a caustic soda (NaOH) solution at a concentration of 500 g/L. Results from the precipitation tests revealed that the precipitated phases contained, in addition to aluminium, high amounts of sulphates. This indicated the formation of two phases, namely aluminium trihydroxide ($Al(OH)_3$) and basic aluminium sulphate with the general formula ($Al(OH)_x(SO_4)_y$). It was also found that the optimum pH for the formation of $Al(OH)_3$ is in the range of 8.0 to 8.5. At this pH, the amount of basic aluminium sulphate formed was reduced.

TABLE 1

| | Assay of solids formed | | | | |
|---|---|---|---|---|---|
| | pH 6.5 | pH 7.0 | pH 7.5 | pH 8.0 | pH 8.5 |
| Al, % | 26 | 26 | 28 | 32 | 34 |
| $SO_4^{2-}$, % | 18 | 16 | 14 | 12 | 10 |

Example 2

A fully integrated pilot plant operated as per the diagrams of the type shown in FIGS. 1 to 4 capable of processing 10 L/h of water, was operated for a period of 2 weeks. The combination of the heavy metal precipitation stage and the gypsum de-supersaturation stage was successful and average precipitation efficiencies of 98%, 97%, 96%, 96% and 25% were achieved for magnesium, manganese, aluminium, iron and sulphate respectively. The results in the ettringite precipitation stage showed that the target sulphate concentration of 400 mg/L (SANS Class I specification) in the overflow was reached, and potable water was produced after the carbonation stage in FIG. 3. The results from the ettringite decomposition stage showed a 99.5% recovery of amorphous aluminium trihydroxide precipitate.

Example 3

This example illustrates heavy metal and gypsum precipitation, ettringite precipitation and ettringite decomposition steps of the invention.

A mini pilot plant capable of processing 100 L/h of acid mine water using the consolidated process of FIG. 1-4, was operated continuously for a period of four weeks. The feed to the plant consisted of a synthetic solution containing bivalent cations such as $Mg^{2+}$, $Ca^{2+}$, $Mn^{2+}$, as well as $SO_4^{2-}$ and $Fe^{2+}$. The average feed composition is presented in Table 2.

TABLE 2

| Feed water composition (expressed in mg/L) | | | | | | |
|---|---|---|---|---|---|---|
| Mg | Al | Si | Ca | Ti | Cr | Mn |
| 67 | 42 | 6 | 295 | 2 | 2 | 39 |
| Co | Ni | Cu | Zn | Pb | Fe | $SO_4^{2-}$ |
| <2 | <2 | <2 | <2 | <2 | 4 | 1308 |

The results of the pilot campaign showed that the process was effective at removing heavy metals from contaminated water. The treated water produced was nearly free of heavy metal ions, namely iron, aluminium, manganese and magnesium. Removal efficiencies of 97% and 93% were obtained for magnesium and manganese, respectively. Lime consumption was averaged at 1.4 kg/m³ of feed water.

The removal of sulphate and calcium ions from contaminated water via ettringite precipitation produced SANS Class I water in terms of sulphate (<400 mg/L) with sulphate removal efficiencies ranging from 80% to 91%, and calcium removal efficiencies as high as 74%. The corresponding aluminium trihydroxide consumption rate was in the range of 0.9 to 1.1 kg/m$^3$ of feed water at an aluminium trihydroxide feed ratio of approximately 1.1 to 1.3 times the stoichiometric amount required. The consumption of lime ranged between 1.0 and 1.8 kg/m$^3$ of feed water. Aluminium trihydroxide was regenerated in the ettringite decomposition step with the addition of sulphuric acid at a rate of around 0.4 kg/m$^3$ of feed water.

The invention claimed is:

1. A method of decomposing ettringite, which includes the step of lowering a pH of a slurry containing ettringite to a value between 8 and 8.5 to form amorphous aluminium trihydroxide and gypsum crystals in suspension.

2. A method of recovering amorphous aluminium trihydroxide from a slurry which contains ettringite, wherein the method includes the steps of lowering the pH of the slurry to a value between pH 8 and pH 8.5 to decompose and form a supersaturated calcium sulphate-containing stream, with gypsum crystals in suspension, and separating aluminium trihydroxide from the stream in a solid-solid separation process.

3. A method according to claim 1 which includes the step of forming the slurry which contains ettringite by adding amorphous aluminium trihydroxide and lime to a calcium sulphate-containing waste water stream.

4. A method according to claim 2 which includes the step of forming the slurry which contains ettringite by adding amorphous aluminium trihydroxide and lime to a calcium sulphate-containing waste water stream.

\* \* \* \* \*